Dec. 4, 1934.  E. T. KEENAN  1,982,742
FRUIT JUICE EXTRACTOR
Filed Oct. 22, 1930
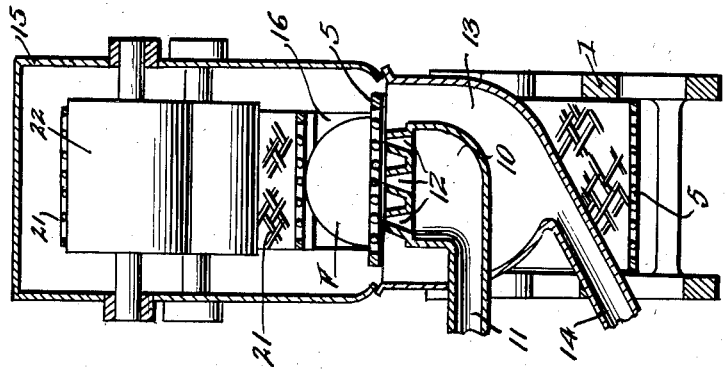
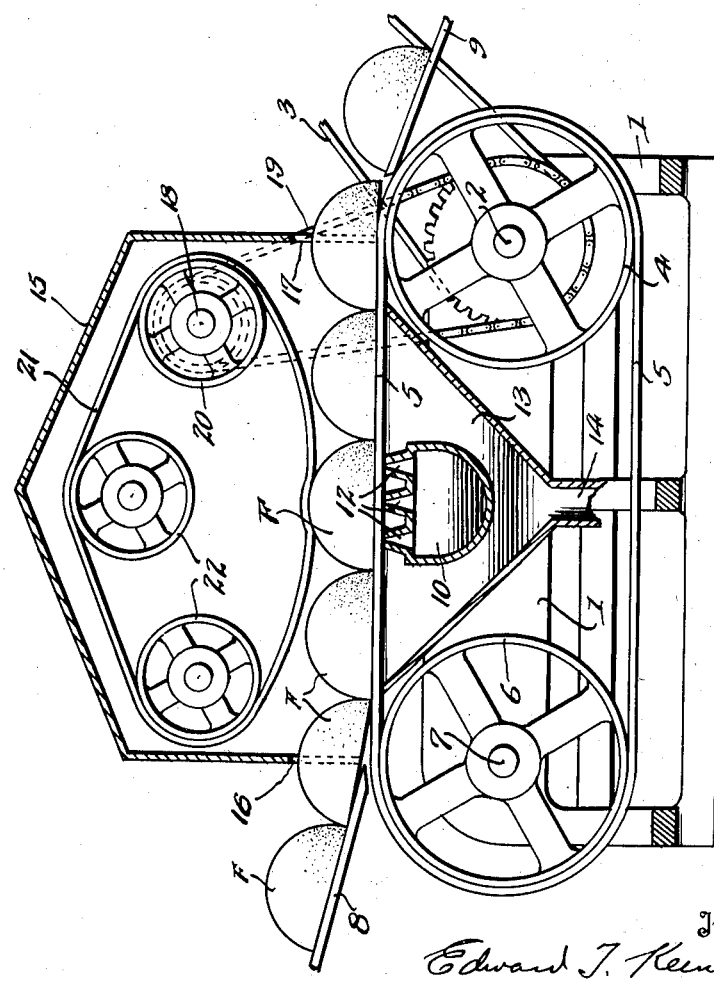

Patented Dec. 4, 1934

1,982,742

UNITED STATES PATENT OFFICE 1,982,742

FRUIT JUICE EXTRACTOR

Edward T. Keenan, Frostproof, Fla.

Application October 22, 1930, Serial No. 490,505

15 Claims. (Cl. 146—3)

This invention relates to an improvement in fruit juice extractors.

The object of the invention is to improve the manner of extracting fruit juices, particularly from citrus fruits, and to provide for the use of compressed air for this purpose.

The device involves the successive feeding of the citrus fruit in halves by means of a reticulated conveyor over a compressed air nozzle through which compressed air or gas is forced into the pulp to eject the juice sacs and juice from the halves of the fruit, permitting them to fall into a receptacle from where they may be withdrawn from the machine.

In the accompanying drawing:

Fig. 1 is a longitudinal sectional view through the machine; and Fig. 2 is a transverse sectional view through the same.

A suitable frame for the machine is designated generally by the numeral 1, in which a drive shaft 2 is journaled and is driven from a suitable source of power by means of a belt or chain 3. A pulley 4 is fixed on the shaft 2 and receives a screen belt 5, which passes therearound and around a pulley 6 fixed to a driven shaft 7, likewise journaled in the frame 1.

The screen belt 5 is reticulated or formed of metallic mesh material so as to be flexible and at the same time permit the juice and pulp sacs of the fruit to pass therethrough. The screen belt 5 serves as a conveyor for the fruit F, the halves of which are fed onto the screen belt from a slide 8 and are directed from the screen belt 5 onto a similar slide or table 9.

Disposed beneath the screen belt 5 between the pulleys 4 and 6 is a head 10 communicating with a suitable source of air or gas under pressure through the pipe 11, and this head 10 is provided with nozzles 12 directed upwardly to a point just beneath the screen belt 5, so as to deliver compressed air or gas through the screen belt and into the half of the citrus fruit carried by the screen belt, so as to force the juice and juice sacs from the fruit.

A hopper or pan 13 is arranged around the head 10 and beneath the screen belt 5 to catch the juice and juice sacs dislodged from the halves of the fruit by the action of the compressed air or gas. The juice and pulp are carried off from the hopper or pan 13 through a pipe 14.

A cover 15 is disposed over the upper part of the machine so as to prevent any splashing of the juice, which cover is provided with an inlet opening 16 and an outlet opening 17 of sufficient size to permit the fruit to pass readily therethrough.

A shaft 18 is journaled within the cover 15 and is driven through a suitable sprocket chain 19 from the drive shaft 2. The shaft 18 carries a pulley 20 over which passes a reticulated screen belt 21, which is driven by the pulley 20, and which belt 21 likewise extends over idle pulleys 22. The lower section of the screen belt 21 is relatively loose and serves to engage the upper sides of the fruit sections F as they pass over the nozzles 12 to hold the sections in position on the screen belt 5 during the subjection thereof to the action of the compressed air or gases for the removal of the fruit juice or juice sacs.

Instead of the pulleys 20 and 22, other suitable forms of driving wheels for the screen belt may be used, as found desirable. Likewise other forms of driving wheels may be used for the pulleys 4 and 6 if desired.

The screen belts 5 and 21 are preferably geared together to be driven at a fixed and the same linear rate of speed, so that as the sections of the citrus fruit, such as oranges, grapefruit or the like are fed in an inverted position from the slide 8 to the screen belt 5, they will come between this belt 5 and the screen belt 21, which thus serves to hold them in place as they pass over the nozzles 12. Compressed air or gas is discharged through the head 10 and nozzles 12 into the halves of the fruit as they pass along the belt 5 and over these nozzles. The compressed air or gas may be discharged intermittently or continuously but it is preferable that the discharge be intermittent and properly timed to direct the charge of compressed air or gas into each half of the fruit as it reaches a position immediately over the nozzles.

This forces out the juice and juice sacs, and by reason of the belt 5 being reticulated, the juice and juice sacs are allowed to fall through this belt into the pan or hopper 13, from which they are directed off into a suitable container through a pipe. The hulls of the fruit sections may then be discharged from the machine by the belt 5 onto a suitable slide 9 or the like.

This serves as an effective means of utilizing either compressed air or gases for the removal of the juice and juice sacs from sections of citrus fruit or the like, and eliminates the necessity of grinding out the pulp of the fruit in order to extract the juice.

I claim:

1. In a fruit juice extracting machine of the character described, the combination of a conveyor having openings therethrough and adapted to receive fruit sections on one side thereof, and means located on the opposite side of the conveyor directing jets of gaseous fluid under pressure through the openings therein for removing the juice and juice sacs from the fruit.

2. In a fruit juice extracting machine of the character described, the combination of a reticulated conveyor for receiving fruit sections on a side thereof, and means disposed on the opposite side of said conveyor directing jets of gaseous fluid under pressure through the conveyor against the fruit sections to remove the juice and juice sacs from the fruit.

3. In a fruit juice extracting machine of the character described, the combination of a reticulated conveyor for receiving citrus fruit sections in inverted positions on a side thereof, and means disposed on the opposite side of the conveyor from the citrus fruit sections for supplying jets of gaseous fluid under pressure through the conveyor to remove the juice and juice sacs from the fruit sections.

4. In a fruit juice extracting machine, the combination of a reticulated conveyor for receiving citrus fruit sections in inverted positions on a side thereof, means disposed opposite said side of the conveyor for supplying jets of gaseous fluid under pressure through the conveyor to act on the citrus fruit sections carried thereby for the removal of the juice therefrom, and a hopper or pan disposed beneath the conveyor for receiving the juice removed from the fruit sections.

5. In a fruit juice extracting machine, the combination of a reticulated conveyor for receiving citrus fruit sections in inverted positions on a side thereof, means disposed opposite said side of the conveyor for supplying jets of gaseous fluid under pressure through the conveyor to act on the citrus fruit sections carried thereby for the removal of the juice therefrom, and means for holding the fruit sections in positions during subjection to the gaseous fluid.

6. In a fruit juice extracting machine, the combination of a reticulated conveyor for receiving citrus fruit sections in inverted positions on a side thereof, a nozzle disposed opposite said side of the conveyor for supplying a gaseous fluid under pressure through the conveyor to act on the citrus fruit sections carried thereby for the removal of the juice therefrom, a belt arranged over and in parallel relation to the conveyor for engaging the fruit sections and holding the same in position during subjection thereof to the gaseous fluid, and means for driving said belt at approximately the same linear speed as the conveyor.

7. In a fruit juice extracting machine, the combination of a frame, a reticulated conveyor mounted in the frame, a drive shaft for said conveyor, said conveyor being adapted to receive citrus fruit sections in inverted positions thereon, a head mounted beneath a side of the conveyor and adapted to communicate with a source of fluid under pressure, a plurality of nozzles carried by the head and extending upwardly said nozzles being arranged to direct a plurality of jets of fluid through the reticulated conveyor against a section of citrus fruit to remove the juice therefrom, and a hopper or pan disposed beneath the conveyor for receiving the juice.

8. In a fruit juice extracting machine, the combination of a frame, a reticulated conveyor mounted in the frame, a drive shaft for said conveyor, said conveyor being adapted to receive citrus fruit sections in inverted positions thereon, a head mounted beneath a side of the conveyor and adapted to communicate with a source of gaseous fluid under pressure, a plurality of nozzles carried by the head and extending upwardly to direct the gaseous fluid through the reticulated conveyor, and to act on the citrus fruit sections to remove the juice therefrom, a hopper or pan disposed beneath the conveyor and surrounding the head for receiving the juice, an endless belt member arranged approximately parallel with and over the conveyor for engaging the fruit sections and holding the same in position while being subjected to the compressed fluid, and means operatively connected with the drive shaft for the conveyor for driving said belt at approximately the same linear speed as the conveyor.

9. In a fruit juice extracting machine, the combination of a frame, a reticulated conveyor mounted in the frame, a drive shaft for said conveyor, said conveyor being adapted to receive citrus fruit sections in inverted positions thereon, a head mounted beneath a side of the conveyor and adapted to communicate with a source of gaseous fluid under pressure, a plurality of nozzles carried by the head and extending upwardly to direct the gaseous fluid through the reticulated conveyor, and to act on the citrus fruit sections to remove the juice therefrom, a hopper or pan disposed beneath the conveyor and surrounding the head for receiving the juice, an endless belt member arranged approximately parallel with and over the conveyor for engaging the fruit sections and holding the same in position while being subjected to the compressed fluid, means operatively connected with the drive shaft for the conveyor for driving said belt at approximately the same linear speed as the conveyor, and a cover extending over the belt and top of the conveyor to prevent splashing of the juice, said cover having openings in the opposite ends thereof for the fruit sections to pass therethrough.

10. In a fruit juice extracting machine, the combination of an endless conveyor for receiving citrus fruit sections, a nozzle disposed in position to supply a fluid under pressure to act on the fruit sections for the removal of the juice therefrom, and a belt arranged in approximately parallel relation to the conveyor in position for holding the fruit sections in position thereon.

11. In a fruit juice extracting machine, the combination of an endless conveyor for receiving citrus fruit sections, a nozzle disposed in position to supply a fluid under pressure to act on the fruit sections for the removal of the juice therefrom, a belt arranged over and in parallel relation to the conveyor in position for engaging the fruit sections and holding them in position during subjection thereof to the fluid, and means for driving said belt at approximately the same linear speed as the conveyor.

12. In a fruit juice extracting machine, the combination of an endless perforated conveyor for receiving citrus fruit sections, a nozzle disposed in position for supplying a fluid under pressure through a side of the perforated conveyor to act on the citrus fruit sections for the removal of the juice therefrom, a belt arranged in approximately parallel relation to the conveyor in position for engaging the fruit sections and holding the same in position during subjection thereof to the action of the fluid, and means for driving said belt at approximately the same linear speed as the conveyor.

13. In a fruit juice extracting machine, the combination of a conveyor for receiving citrus fruit sections, and a head adjacent said conveyor having a plurality of orifices distributed over an area approximately corresponding with the open side of a citrous fruit section for directing jets of fluid under pressure into the section for the removal of juice therefrom.

14. In a fruit juice extracting machine, the combination of a conveyor for receiving citrus fruit sections, a head adjacent said conveyor having a plurality of nozzles distributed over an area approximately corresponding with the open side of a citrous fruit section for directing jets of fluid under pressure into the section for the removal of juice therefrom, and means for preventing dislodgment of the fruit sections from the conveyor during subjection thereof to the action of the fluid.

15. In a fruit juice extracting machine, the combination of a perforated conveyor for receiving citrus fruit sections in inverted positions thereon, a head mounted beneath the conveyor and having a plurality of nozzles distributed over an area approximately corresponding with the open side of one of the fruit sections, and for directing gaseous fluid under pressure into each section for the removal of the juice therefrom, and means for supplying gaseous fluid to the head.

EDWARD T. KEENAN.